Oct. 20, 1925.  1,557,943
A. E. MUSTO
TIRE AND WHEEL PROTECTOR
Filed Nov. 26, 1924
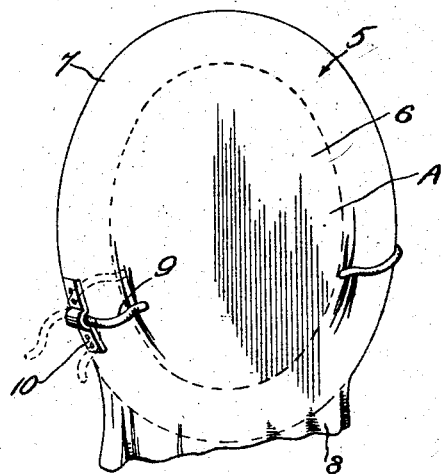
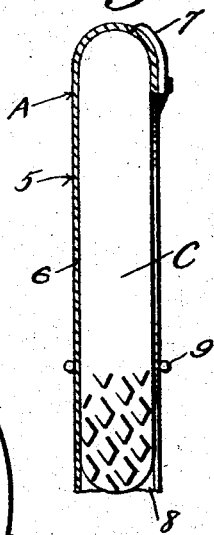
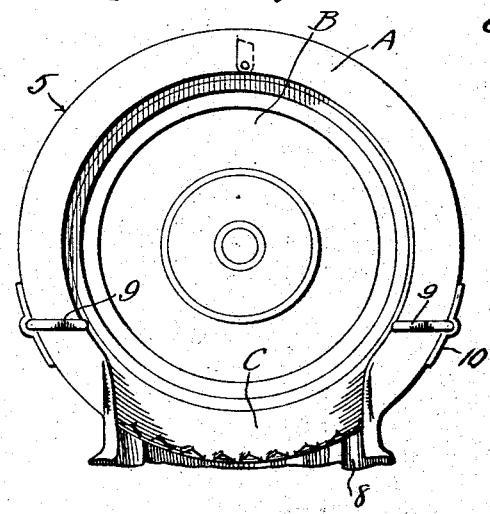
Inventor
ALFRED E. MUSTO.

Patented Oct. 20, 1925.

1,557,943

UNITED STATES PATENT OFFICE.

ALFRED E. MUSTO, OF VANCOUVER, BRITISH COLUMBIA, CANADA.

TIRE AND WHEEL PROTECTOR.

Application filed November 26, 1924. Serial No. 752,462.

*To all whom it may concern:*

Be it known that I, ALFRED E. MUSTO, a citizen of the Dominion of Canada, residing at Vancouver, Province of British Columbia, Canada, have invented certain new and useful Improvements in Tire and Wheel Protectors, of which the following is a specification.

This invention appertains to attachments for motor vehicles and the primary object of the invention is to provide a novel device for protecting automobile tires and wheels from the hot sun during the parking of the automobile.

Another object of the invention is to provide a tire and wheel protector which can be readily slipped over the tire and wheel and firmly held in place against accidental displacement, the protector forming a positive means for not only protecting the tires and wheels from the sun but also protecting the same from rain, dirt and the like.

A further object of the invention is to provide a novel cover for automobile tires and wheels which can be readily placed thereon and removed therefrom in a minimum amount of time.

A still further object of the invention is to provide an improved tire and wheel protector of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings, Figure 1 is a perspective view of the improved protector showing the same applied to the wheel of an automobile, Figure 2 is an elevation of the improved cover looking from the inside thereof showing the same applied to a wheel and cover.

Figure 3 is a vertical transverse section through the improved protector showing the same applied to a tire and wheel.

Referring to the drawings in detail, wherein similar reference characters designate corresponding parts throughout the several views the letter A generally indicates the improved protector for an automobile wheel B. The wheel B has arranged thereon the tire C. The wheel B and the tire C can be of any preferred character and has simply been shown to illustrate the use of the improved protector.

The protector A is adapted to be associated with the tires and wheels of the vehicle when the vehicle is left standing for any length of time in order to protect the same against the sun and the protector A comprises a flexible body 5 preferably formed from water proof canvas or the like.

The body 5 comprises a front wall 6 which is preferably of a substantially circular configuration and an outer arcuate side wall 7 for engaging about the tread of the tire. The wall 6 is adapted to overlie the front face of the wheel as clearly shown in Figures 1 and 3 of the drawing. The lower end of the protector is left open and is provided with a loose flap 8 and the open end of the protector permits the same to be easily slipped over a wheel.

In order to hold the protector on a tire and wheel against accidental displacement the outer wall 7 thereof is provided at opposite sides thereof with swinging spring clips 9. The clips 9 are of substantially a U-shape and are carried for swinging movement by brackets 10 which can be secured to the outer wall 7 of the protector in any desired way.

In view of the fact that the clips 9 are of a resilient nature, it can be seen that the same can be readily swung over the sides of the tire to firmly grip the same.

From the foregoing description, it can be seen that I have provided a novel sun protector for vehicle tires and wheels of a simple and durable nature which can be readily slipped thereon when desired.

Changes as to details may be made without departing from the spirit or the scope of this invention, but:—

What I claim as new is:—

A sun protector for automobile tires and wheels comprising a flexible body including a front wall and a substantial annular side wall of arcuate shape in cross section, the lower end of the side wall being left open and provided with a flap to permit the same to be slipped over a tire and wheel, brackets carried by the opposite sides of the side wall, and resilient U-shaped clips carried by the brackets for gripping the side walls of a tire with which the cover is associated.

In testimony whereof I affix my signature.

ALFRED E. MUSTO.